Oct. 26, 1971   R. B. HUSSEY ET AL   3,615,043
FLUID METERING AND DISTRIBUTING SYSTEM
Filed March 7, 1969   5 Sheets-Sheet 1

INVENTORS:
RUSSELL B. HUSSEY
JOHN A. KIMBERLEY
BY Howson & Howson
ATTYS.

Oct. 26, 1971 R. B. HUSSEY ET AL 3,615,043
FLUID METERING AND DISTRIBUTING SYSTEM
Filed March 7, 1969 5 Sheets-Sheet 2

INVENTORS:
RUSSELL B. HUSSEY
JOHN A. KIMBERLEY
BY
Howson & Howson
ATTYS.

United States Patent Office 3,615,043
Patented Oct. 26, 1971

3,615,043
FLUID METERING AND DISTRIBUTING SYSTEM
Russell B. Hussey, East Longmeadow, Mass., and John A. Kimberley, Granby, Conn., assignors to AMBAC Industries, Incorporated, Garden City, N.Y.
Filed Mar. 7, 1969, Ser. No. 805,251
Int. Cl. F02m 41/08
U.S. Cl. 222—250
8 Claims

ABSTRACT OF THE DISCLOSURE

A shuttle-piston type of fluid metering device in which the length of stroke of the shuttle piston is adjustable by control of the position of the piston for which one end-chamber of the cylinder becomes closed to arrest the piston stroke. Preferably the discharge path for said chamber extends through a pair of adjacent axially disposed and displaced bores in the piston, these two bores being bridged during travel of the piston by an annular passageway in an external axially-positionable control member. When the piston reaches a predetermined position in the cylinder, the external interconnecting passageway is thereby blocked and the corresponding end-chamber thereby sealed off to provide arrest of the piston travel. The axial position of the external member containing the annular passageway therefore controls the length of stroke of the piston and the amount of fluid pumped per stroke of the piston. A system adaptable to supply fuel to anywhere from one to twelve engine cylinders employs three such fluid-metering devices supplying two synchronized fluid-distributing shafts to produce twelve outputs, various groups of which outputs can be used depending upon the number of cylinders in the particular engine.

BACKGROUND OF INVENTION

The invention herein described was made in the course of or under a Contract DAAE07–67–C–4023(T) with the Department of the Army.

There are a variety of applications in which it is desired to provide fluid in metered quantities to one or more utilization devices with controlled timing and in controlled discrete amounts. The invention will be described with particular reference to apparatus for supplying liquid fuel in metered quantities to fuel injection devices associated with each of the cylinders of a diesel engine. Such a system may be of the type described and claimed in copending application Ser. No. 840,266 of Russell B. Hussey, John A. Kimberley, and Warren E. Snyder, filed July 9, 1969 and of common assignee herewith. In such systems fuel injection is produced and timed by apparatus other than that producing the fluid metering; for example, a solenoid-operated injection valve may be actuated by timing apparatus synchronized with engine operation to inject fuel when required for firing. Since the metered fluid is in effect stored in the injection valve until such time as the valve is actuated, the exact time of delivery of the fluid fuel to the injection valve is not critical so long as it occurs once per cycle of an operation, prior to each firing time. However, the amount of fluid in each metered quantity should be adjustable by means of an appropriate control and should be substantially uniform for any given setting of the control. Thus for example in an engine system utilizing a throttle governor to control engine speed, the metered quantity of fuel should remain substantially constant for a given setting of the throttle governor and be variable in response to operation of the throttle governor.

Fluid metering devices of the shuttle piston type are known in the prior art which employ a reciprocating shuttle piston in a cylinder, to opposite end-chambers of which cylinder fluid is alternately supplied. At any given time the outlet from the end-chamber adjacent that end of the piston to which inlet fluid is being supplied is blocked, the end-chamber at the other end of the piston at that time having its inlet blocked off and its outlet open to enable pumping out of the fluid in response to motion of the piston. In such fluid metering devices it is known to locate the end-chamber outlets in such manner that when the piston has entered one of the end-chambers to an extent sufficient to seal off the outlet from that chamber its further motion is arrested by the fluid which is then trapped in that end chamber. The axial position of the outlet determines the corresponding axial extreme of the shuttle piston stroke. In order to vary the length of the piston stroke so as to vary the metered quantity of fluid per stroke, it is known in the prior art to provide a mechanical stop, at least at one end of the cylinder, which is variably positionable to control the point of arrest of the piston and thus the metered quantity. However, such mechanical arrangements require relatively complicated adjustment and sealing arrangements introduced appreciable noise and vibration, and in addition are subject to wear due to repeated impact of the piston against the stop.

A further desideratum in such a system is that the fuel metering and distributing system be versatile and readily adaptable to use in different engines having different numbers of cylinders, for example in engines having anywhere from one to twelve cylinders. Such a system, which may readily be employed in connection with engines having widely different numbers of cylinders, will be designated herein as a universal system. Such a universal system not only has advantages in mass production in that only one type of unit need be manufactured for a large variety of engines, but also has many field service advantages in that any original or replacement system on hand will be operable with any of a large variety of engines and it is therefore not necessary to stock as large a number of different kinds of parts.

Accordingly, it is an object of the invention to provide new and useful apparatus for producing metered quantities of fluid.

A further object is to provide such apparatus in which the quantity of fluid delivered by each piston stroke is readily controllable.

A further object is to provide such apparatus which does not require a mechanical stop to establish the length of piston stroke and is therefore less susceptible to wear.

A further object is to provide such apparatus which produces less noise and vibration than previous mechanically-stopped apparatus for similar purposes.

It is also an object to provide such apparatus which can readily be used to supply metered quantities of fuel to any one of a variety of engines differing with respect to the numbers of cylinders therein, for example engines having from one to twelve cylinders.

Still another object is to provide the latter type of apparatus which is compact, reliable and accurate in operation.

SUMMARY OF THE INVENTION

In accordance with the invention in one aspect, certain of the foregoing objects are achieved by the provision of a shuttle-piston type of fluid metering device in which the length of stroke of the shuttle piston, and hence the quantity of fluid delivered per stroke, is determined by the position of the piston for which fluid becomes trapped in the end-chamber into which the piston is travelling, and in which this position is adjustably controllable. More particularly, in a preferred embodiment of the invention the shuttle piston is mounted for reciprocatory axial motion within a surrounding cylinder having closed ends forming an end-chamber at each end of the piston, to which end-chambers inlet fluid under pressure is alternately applied to drive the shuttle piston back and forth within the cylinder. Outlets are provided from each of the end-chambers for the discharging of the metered fluid in response to piston motion, and travel of the piston into either end-chamber beyond a particular position therein closes the outlet from that end-chamber, thereby trapping fluid in the end-chamber so that further piston travel is arrested. In addition, the axial position of the piston for which the latter end-chamber becomes sealed to arrest piston motion occurs when a predetermined portion of the piston reaches a predetermined axial position with respect to a control structure surrounding the piston, and the latter control structure is controllably positionable axially to change the piston position for which the chamber becomes sealed.

In a preferred embodiment, the outlet for the end-chamber at a first end of the cylinder at which the stroke length is controlled comprises a first axial bore in the shuttle piston, communicating at one end with the latter end-chamber, and a second axial bore, axially displaced from the first bore, communicating at one end with the exterior of the cylinder to provide fluid discharge. The axially-positionable control structure provides a passageway bridging the inner adjacent ends of the two axial bores in the shuttle piston so long as the piston is travelling toward said first end-chamber. However, the control structure is provided with a blocking surface cooperating with a surface of the piston to block communication between the two internal bores when the piston has moved to a predetermined extent into said first end-chamber. Axial adjustment of the control structure changes correspondingly the axial position of the blocking surface thereon, thereby to enable corresponding control of the length of stroke of the piston.

In a preferred form of the invention, there are employed three such shuttle-piston fuel-metering devices supplying two fuel-distributor shafts, each fuel-distributor shaft serving to supply the metered fuel in succession to six different outlet connections per distributor shaft. More particularly, preferably one fuel-metering device supplies its two outputs to one of the distributor shafts, another fuel-metering device supplies its two outputs to the other fuel-metering shaft, and the third fuel-metering device supplies one output to one distributor shaft and its other output to the other distributor shaft. The supply of fuel to the metering devices and the operations of the distributor shafts are synchronized with engine operation, preferably through appropriate gearing, to provide a sequence of metered fuel-output quantities for each cycle of engine operation equal in number to the maximum number of engine cylinders to be accommodated. Where a lesser number of cylinders are employed, certain of the outlets may be blocked or fed back to the fuel supply reservoir. The entire assembly of three metering devices and two distributing shafts may be contained in a single block, with a common control plate for varying together the three control members on the three fuel-metering devices, in response for example to changes in the position of a throttle governor.

The fuel-metering device of the invention not only avoids the undesirable wear, noise and vibration characteristic of previous devices employing mechanical stops for stroke-length adjustment, but also permits control of fuel quantity without requiring flexible or movable connections or complicated sealed control apparatus. In the complete assembly of three fuel-metering devices and two distributor shafts, a highly versatile and effectve, yet compact, unit of the universal type is provided.

BRIEF DESCRIPTION OF FIGURES

These and other objects and features of the invention will be more readily understood from a consideration of the following detailed description, taken in connection with the accompanying drawings, in which.

DETAILED DESCRIPTION OF EMBODIMENTS

Figure 1:
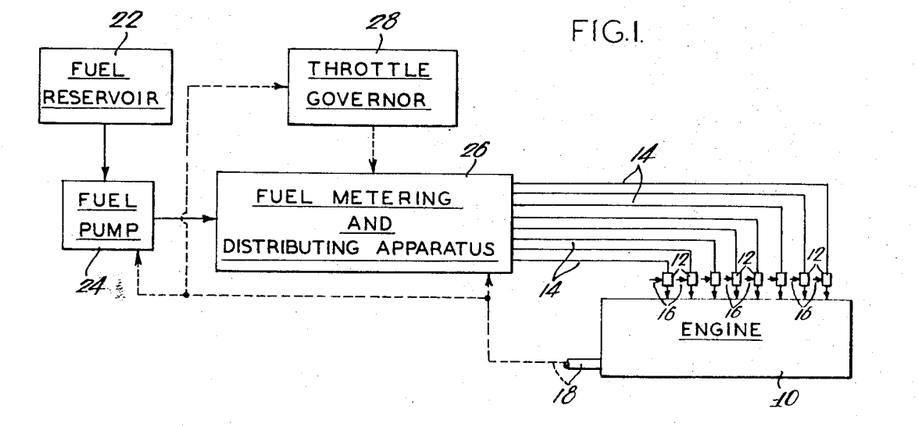
FIG. 1 is a schematic diagram, partly in block form, illustrating one general type of engine system to which the invention is applicable.

In FIG. 1, by way of example of an application of the invention, there is shown an engine 10 which may be a conventional diesel engine. It is supplied with fuel at appropriately-timed instants by means of fuel injector valves such as 12. In this example it is assumed that the engine has eight cylinders and eight corresponding injection valves. Each injector valve is supplied with metered quantities of fuel by way of eight connecting hydraulic lines such as 14. Each metered quantity of fuel is stored in its corresponding injector valve until the valve is actuated by a timing control input appropriately synchronized with operation of the engine, applied thereto as at 16. For example, the injector valves 12 may be of the solenoid-operated type, in which the timing control inputs may be electrical currents for energizing the solenoids. Among suitable arrangements (not shown) for synchronizing the operation of the valves are mechanical and photoelectric devices responsive to rotation of the engine drive shaft 18 to produce timing signals indicative of the phase of the shaft 18 at any given time.

Fuel is stored in the usual fuel reservoir 22 and delivered by fuel pump 24 to fuel metering and distributing apparatus 26, constructed and arranged in accordance with the present invention. A throttle governor 28 may be utilized to control the fuel metering and distributing apparatus 26 so as to vary the quantity of fuel thereby delivered to the injection valves 12 and to engine 10. Engine drive shaft 18 is appropriately connected to fuel pump 24, fuel metering and distributing apparatus 26 and throttle governor 28 so as to maintain the desired synchronization between their respective operations and that of the engine 10.

The fuel metering and distributing apparatus 26 of the invention is therefore adapted to receive fuel and distribute it sequentially in metered quantities to each of the cylinders of engine 10 by way of the respective injection valves 12, and so to deliver it in quantities dependent upon the setting or adjustment of the throttle governor 28. While an engine having eight cylinders is shown in FIG. 1, it is one feature of the invention that the fuel metering and distributing apparatus 26 is readily able to supply engines having different numbers of cylinders, e.g. from one to twelve cylinders, as will become apparent from the following detailed description.

Figure 2:
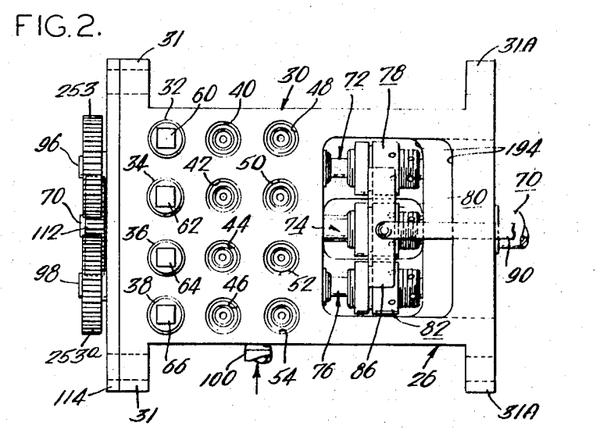
FIG. 2 is a plan view of a preferred embodiment of the invention.
Figure 3:
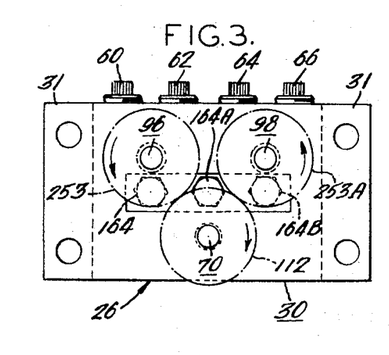
FIG. 3 is an end elevational view of the apparatus of FIG. 2.
Figure 4:
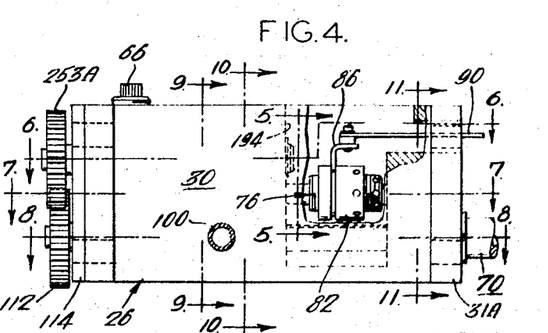
FIG. 4 is an elevational side view of the apparatus of FIG. 2.
Figure 5:
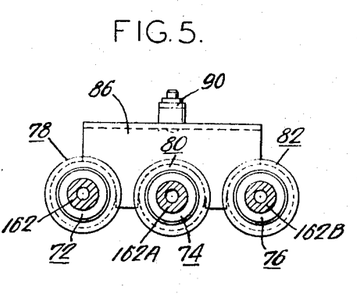
FIG. 5 is a sectional view taken along lines 5—5 of FIG. 4.

FIG. 2 shows in plan view one embodiment of fuel metering and distributing apparatus 26 as it would be used to supply liquid fuel to an eight-cylinder diesel engine. All parts are supported in or on a metal housing block 30 having a pair of apertured mounting flanges 31 and 31A by means of which it may be mounted on or adjacent the engine 10. Block 30 is provided at its top surface with twelve fluid discharge ports arranged in three axially-displaced column of four each, and numbered 32, 34, 36, 38, 40, 42, 44, 46, 48, 50, 52 and 54. In this example of use, the first column of ports 32, 34, 36 and 38 is not used, each of these ports instead being sealed off or closed by a corresponding threaded plug, i.e. plugs 60, 62, 64 and 66 respectively. The remaining eight discharge ports are connected, by way of any suitable threaded connectors (not shown) and lines 14 of FIG. 1, to the different injector valves 12 for the different cylinders of an eight-cylinder engine. In the case of a twelve-cylinder engine, the plugs 60 through 66 are not employed, and all twelve discharge ports are connected to the respective twelve injection valves. Other numbers of cylinders may be accommodated by plugging of others of the discharge outlets, or by returning them to the fuel reservoir 22 of FIG. 1.

Figure 6:
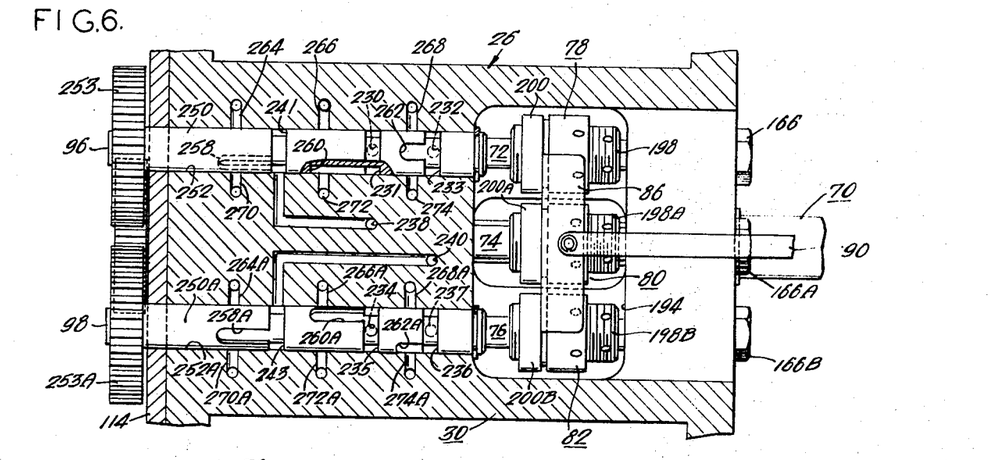
FIG. 6 is a sectional view taken along lines 6—6 of FIG. 4.

The complete assembly 26 consists generally of an inlet fuel-supply structure 70 extending through the lower portion of housing block 30 (see especially FIGS. 8 and 9–13); three substantially identical shuttle-piston fuel metering devices 72, 74 and 76 (see especially FIG. 7); three fuel-quantity control structures 78, 80 and 82 (FIGS. 2 and 6) for fuel metering devices 72, 74 and 76 respectively; a common fuel control bracket 86 for simultaneously changing the axial positions of the three fuel-quantity control structures in response to axial motion of a common control arm 90 operated by the throttle governor 28 of FIG. 1; and two fuel-distributing structures 96 and 98 (see especially FIG. 6) for distributing the fuel delivered by the fuel-metering devices to the injector valves 12 in proper sequence and at proper times. Thus fuel from fuel-pump 24 is delivered to fuel-inlet connector 100, supplied by inlet fuel-supply structure 70 alternately to opposite ends of each of the three fuel metering devices, and delivered therefrom by way of the two fuel distributor structures 96 and 98 to the lines leading to the injection valves, as will now be described in further detail.

Considering first the inlet fuel-supply structure 70 with particular reference to FIGS. 8–13, liquid fuel is supplied from fuel pump 22 to threaded inlet connector 100 in block 30 and travels through transverse bore 102 to an annular chamber 104 formed between the walls of axial bore 106 and the fuel-supply shaft 108 mounted for rotation therein. The end of shaft 108 which protrudes from the left side of block 30 (FIG. 8) is provided with a spur gear 112 which turns with the shaft and is driven in synchronism with engine operation. Shaft 108 is held fixed against rightward axial motion by apertured end plate 114 secured to block 30, and against leftward motion by a snap ring 116 held in an annular groove 118 in shaft 108. Appropriate bearing surfaces for shaft 108 are provided at 120 and 122. The right-hand end of shaft 108 protrudes from block 30 and in this example is provided with an integral miter gear 126, which may be arranged to mesh with and drive a timing gear (not shown).

Annular chamber 104 communicates, by way of a transverse bore 127 in shaft 108, with a central axial bore 128 in shaft 108. Axial bore 128 is closed at its opposite ends and provided with a pair of axially spaced-apart and mutually-perpendicular cross-bores 130 and 132. Cross-bore 130 is provided at its opposite ends with a pair of circumferentially-spaced peripheral slots 134 and 136, while cross-bore 132 is provided with a corresponding pair of peripheral slots 138 and 140 (see especially FIGS. 9 and 11). Each of the peripheral slots 134, 136, 138 and 140 in this example extends approximately ⅛th of the way around the fuel supply shaft 108. Slots 134 and 136 are axially positioned so that each communicates once each revolution of the supply shaft with one end of each of the three bores 144, 146 and 148 in succession; the latter three bores supply fuel respectively to fuel metering devices 72, 74 and 76, near the left-hand end of the latter devices as viewed in FIGS. 2 or 7. Slots 138 and 140 are of the same dimensions as slots 134 and 136, and each slot delivers fuel once per revolution of the fuel supply shaft to bores 150, 152 and 154 successively and thence to the right-hand ends of the fuel-metering structures 72, 74 and 76 respectively. The inlet ends of the bores 144, 146 and 148 are in this example so positioned that adjacent pairs of the bores are just encompassed by the peripheral length of each of the slots 134 and 136, and the bores 150, 152 and 154 are similarly arranged with respect to the slots 138 and 140. It will be understood that various of the bores and passages which "dead-end" within the block 30 may be formed by drilling completely through the block and then plugging up unwanted passages in the bores with suitable plugs (not shown).

With this arrangement, fuel is supplied first to the right-hand inlet 151 (see FIG. 11) for fuel metering device 72, next to the right-hand inlet 153 for fuel metering device 74, then to the right-hand inlet 155 for fuel metering device 76; when the fuel supply shaft is turned slightly farther, all of the bores leading to the inlets at the right-hand ends of the fuel metering devices are blocked and fuel is then supplied to the left-hand inlets 145, 147 and 149 (see FIGS. 7 and 9) of the same fuel metering devices in sequence. Fuel is thereby supplied alternately to opposite ends of the individual fuel metering devices in synchronism with engine operation, and at progressively different times for the three fuel metering devices.

The three fuel metering devices 72, 74 and 76 may be substantially identical, hence only one need be described in detail and corresponding parts of the other two will be designated by the same numeral with a different letter suffix. For example, fuel metering device 72 comprises an axial bore 160 (FIG. 7) through block 30 from end to end thereof containing the axially reciprocable shuttle piston 162. Opposite ends of bore 160 are closed by threaded plugs 164 and 166 leaving enough open length of the bore 160 to provide a left-hand end-chamber 168 and a right-hand end chamber 170 at opposite ends of piston 162. Inlets 145 and 151 from the fuel supply shaft communicate with the end chambers 168 and 170 respectively.

Figure 7:
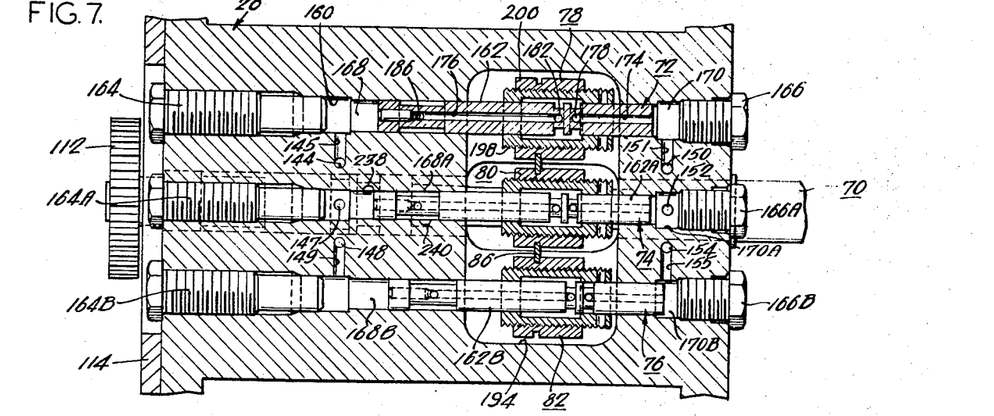
FIG. 7 is a sectional view taken along lines 7—7 of FIG. 4.
Figure 8:
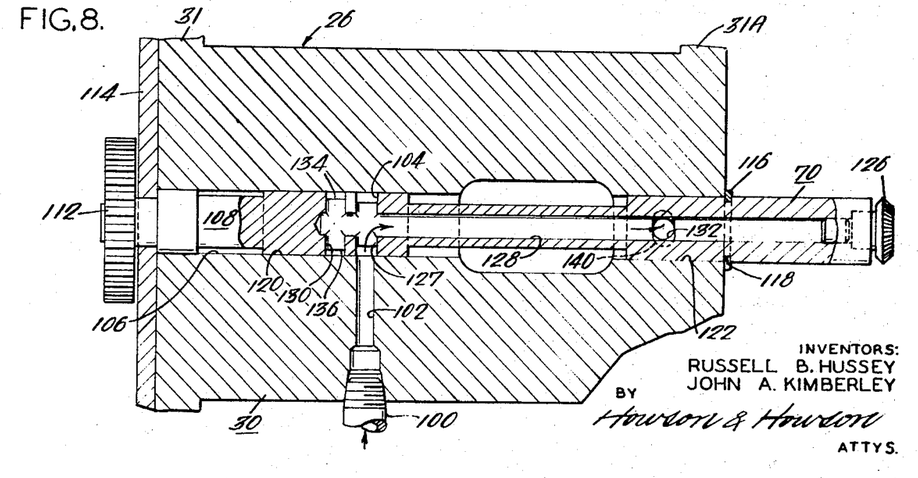
FIG. 8 is a sectional view taken along lines 8—8 of FIG. 4.
Figure 9:
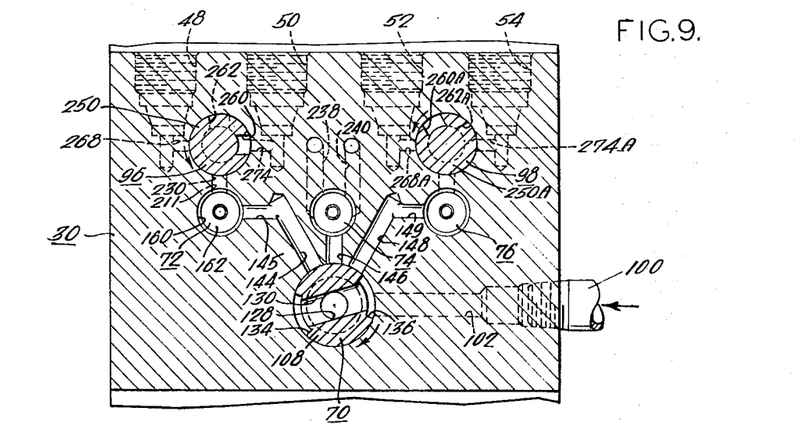
FIG. 9 is a sectional view taken along lines 9—9 of FIG. 4.
Figure 10:
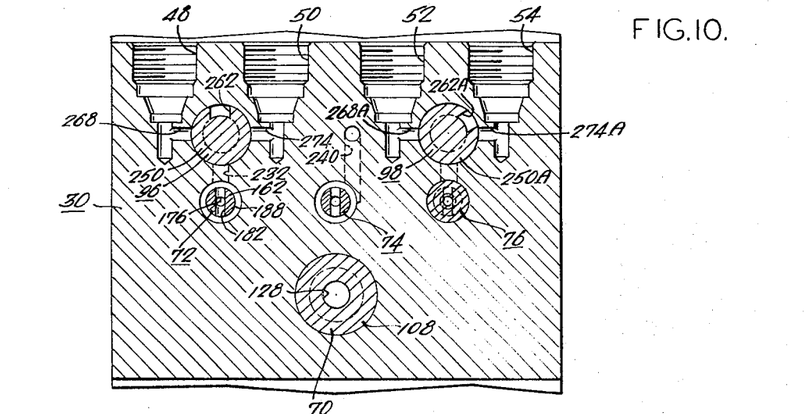
FIG. 10 is a sectional view taken along lines 10—10 of FIG. 4.
Figure 11:
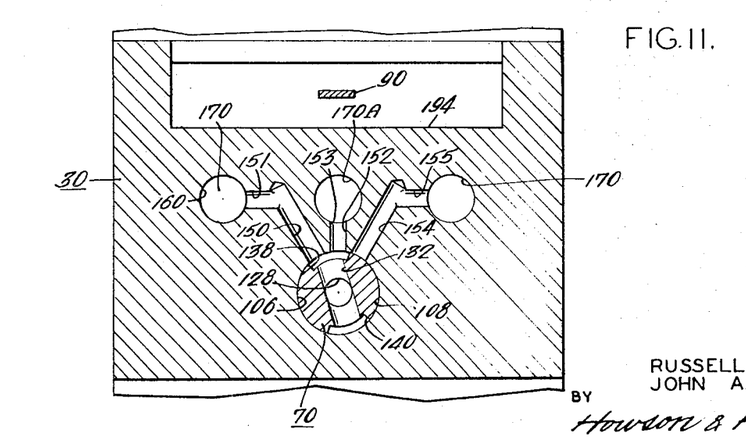
FIG. 11 is a sectional view taken along lines 11—11 of FIG. 4.

Shuttle piston 162 is provided with a pair of axially-displaced and axially-extending central bores or passageways 174 and 176. The right-hand end of bore 174 communicates with end-chamber 170 and the left-hand end thereof communicates by way of a cross-bore 178 with the exterior of a recessed annular portion 180 of the piston. Bore 176 at its right-hand end communicates by way of cross-bore 182 with the exterior of a recessed annular portion 184 of piston 162, and at its left-hand end communicates by way of the cross-bore 186 with the surface of an annular recess 188 in piston 162, which forms with block 30 an annular outlet chamber 189. The portion of bore 176 extending to the left-hand end of the piston is closed by a suitable plug 190.

Figure 12:
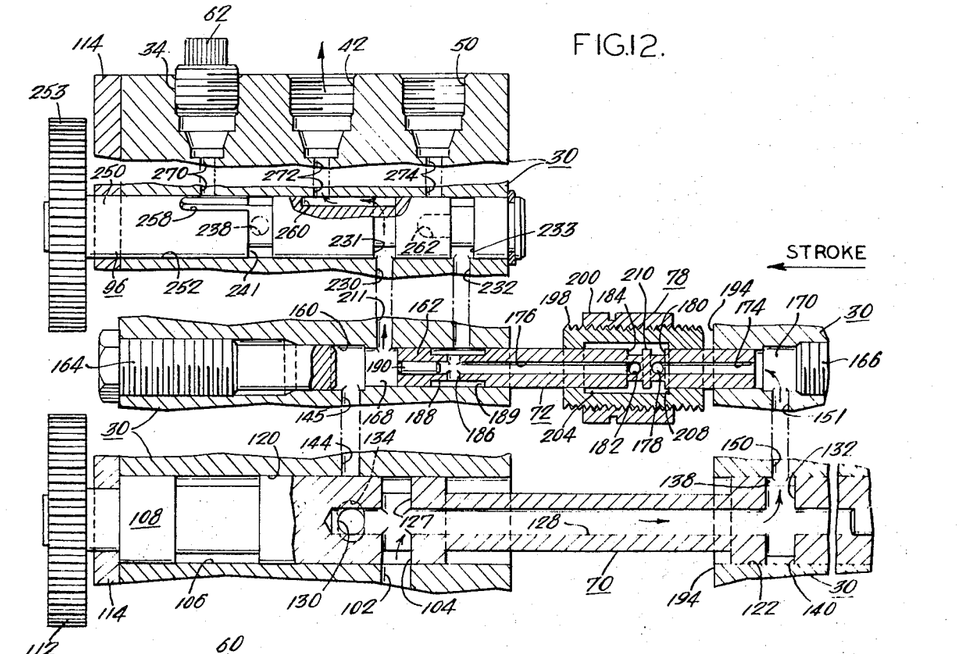
FIGS. 12 and 13 are schematic sectional views illustrating a portion of the apparatus such as that of FIG. 2 and to which particular reference will be made in describing the operation of the fuel metering and distributing apparatus of the invention.
Figure 13:
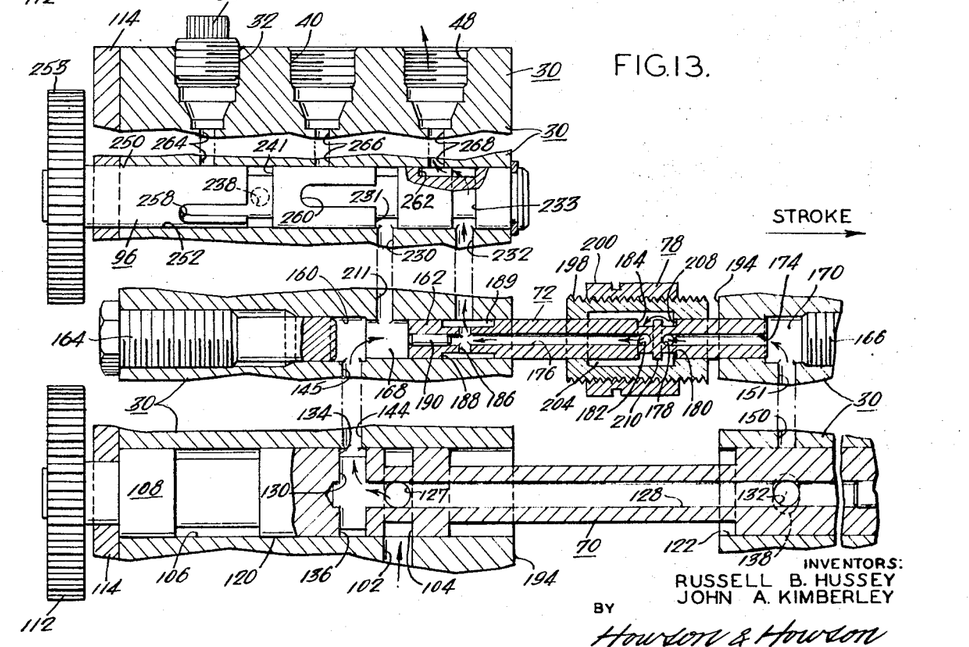

A generally-rectangular cavity 194 extends downward through block 30, as may readily be provided during original casting of the block, through which the middle portions of the three pistons of the three fuel metering devices extend, and in which are located the three fuel-quantity control structures 78, 80 and 82. Fuel-quantity control structure 78, which may be identical to the other two, comprises an externally-threaded bridging sleeve 198 axially-slidable on the exterior of piston 162, and a threaded adjustment sleeve 200 which engages the fuel control bracket 86 and can be adjustably positioned by screwing it along the exterior of the bridging sleeve 198. As explained previously, the fuel control bracket 86 is axially moveable in response to motion of the control arm 90, thereby to vary the relative position of bridging sleeve 198 with respect to the piston-cylinder bore 160. The portions of bridging sleeve 198 which slide on piston 162 as is shown particularly clearly in the enlarged view of FIG. 13, the interior of bridging sleeve 198 is relieved to form an annular bridging chamber or passageway 204 providing fluid communication between the crossbores 178 and 182 in the adjacent ends of the axial bores 174 and 176 in piston 162 during travel of the piston. At the right-hand end of chamber 204, sleeve 198 is provided with a cylindrical liquid-blocking surface 208 adapted to surround closely, and provide a liquid seal with, the peripheral edge of an annular flange 210 on piston 162 between the recessed annular portions 180 and 184 of the piston. As shown in FIGS. 7, 12 and 13, outlet means from end-chamber 170 are provided comprising in series the axial bore 174, cross-bore 178, bridging chamber 204, cross-bore 182, axial bore 176, cross-bore 186 and annular outlet chamber 189. However, when piston 162 moves to the right and enters end-chamber 170 to the extent that the periphery of flange 210 enters the cylinder formed by the blocking surface 208, communication between cross-bores 178 and 182 is thereby cut off or blocked, and the outlet means for end-chamber 170 is thereby closed off. At the other end of the shuttle piston, the outlet port 211 for left-hand end-chamber 168 is open in the position shown in FIGS. 7, 12 and 13 and is closed by the piston 162 when the piston is moved sufficiently to the left to cover the internal end of outlet port 211, thus sealing off chamber 168.

The details of operation of the shuttle-piston fluid metering device 72 will be described more fully hereinafter with particular reference to FIGS. 12 and 13.

As shown particularly clearly in FIGS. 6, 9, 10 and 12, fuel from fuel metering device 72 is supplied to fuel distributing structures 96 and 98. Thus fluid metering device 72 has its outlet port 211 connected through outlet passage 230 to the inlet annulus 231 of fuel distributor structure 96 and another outlet passage 232 connects outlet chamber 189 to the inlet annulus 233 of fuel distributing structure 96. Fluid metering device 76 has one of its outlet passages 234 connected to the left-hand inlet annulus 235 of fuel distributing structure 98 and its other outlet passage 237 connected to the right-hand inlet annulus 236 of fuel distributing structure 98. Outlet passages 238 and 240 from fuel metering device 74 communicate respectively with inlet annuli 241 and 243 of fuel distributing structures 96 and 98.

The fuel distributing structures 96 and 98 may be substantially the same in general form, and hence only structure 96 will be described in detail, corresponding parts of the other structure 98 being indicated by corresponding numerals with suffix A. Structure 96 comprises a fuel metering shaft 250 mounted for rotation in a cylindrical bore 252 in block 30 and provided at its exterior left-hand end with a spur gear 253 driven by spur gear 112 so as to operate synchronously with engine operation. The outer surface of shaft 250 is provided with three axially-extending and axially and peripherally displaced slots 258, 260 and 262 communicating with the annuli 241, 231 and 233 respectively. Outlet ports 264, 266 and 268 in block 30 are axially aligned with slots 258, 260 and 262 respectively so as to be supplied with fuel from shaft 250 in sequence as the shaft rotates, and to deliver the fluid respectively to the discharge ports 32, 40 and 48 of FIG. 2.

On the opposite side of shaft 250 are disposed outlet passages 270, 272 and 274, axially aligned with slots 258, 260 and 262 and communicating respectively with discharge ports 34, 42 and 50 of FIG. 2. In this way fuel is delivered to discharge ports 32, 34, 40, 42, 48 and 50 in a predetermined sequence and in predetermined phase with respect to engine operation. Fuel distributing structure 98 comprises the fuel distributing shaft 250A comprising three axially and peripherally displaced slots 258A, 260A and 262A occupying peripheral positions different than those for fuel distributing shaft 250, so that when spur gear 253A is driven by gear 112 to rotate shaft 250A, fuel is delivered to the discharge ports 36, 38, 44, 46, 52 and 54 of FIG. 2 in predetermined sequence and at different times than for the previously described other discharge ports. In this way timed delivery of metered fuel to each of the twelve discharge ports is provided in the desired synchronization with engine operation.

At the same time, motion of control arm 90 in response to operation of throttle governor 28 acts through fuel control bracket 86 to move, axially and together, the three bridging sleeves such as 198 in each of the fuel-quantity control structures 78, 80 and 82, thereby to vary controlledly the quantity of metered fuel delivered to the injection valves 12 of engine 10 as shown in FIG. 1.

Reference is now made particularly to FIGS. 12 and 13, in which corresponding parts are designated by corresponding numerals, for a more detailed description of the operation of the apparatus of the invention.

FIG. 12 illustrates operation during the leftward stroke of shuttle piston 162 to deliver fluid to discharge port 42. Under these conditions, fuel from inlet connector 100 (FIG. 9) is blocked from delivery to the left-hand end-chamber 168 of the shuttle piston since neither of the peripheral slots 134 or 136 is in alignment with the passageway 144 at this point in engine operation. On the other hand, fuel from inlet connector 100 is delivered by way of inlet bore 150 to the right-hand end-chamber 170 of fuel metering structure 72. However, at this time fuel-distributing shaft 250 is turned so that its outlet slot 262 is blocked off and does not communicate with its associated discharge port 50 nor with any other discharge port. Fuel in end-chamber 170 therefore exerts a pressure on the right-hand end of piston 162, urging it to the left and pumping fuel out of discharge outlet 42 by way of slot 260 communicating therewith in the position then assumed by distributing shaft 250. This pumping action continues until the left-hand end of piston 162 has closed off outlet passage 211 from left-hand end-chamber 168. At this time fuel its trapped in chamber 168, which therefore provides a cushioned but definite arrest of further leftward motion of piston 162.

FIG. 13 illustrates fuel supply structure 70, fuel metering structure 72 and fuel distributing structure 96 at a point in the cycle in which fluid is delivered to discharge outlet 48. Fuel from inlet connector 100 is blocked off from delivery to end chamber 170 because of the position of slot 138 in fuel supply shaft 108, and is instead delivered by way of slot 134 to the left-hand end-chamber 168. At this point, distributor shaft 250 is turned to a position for which discharge from end-chamber 168 is blocked off because slot 260 of the distributing shaft 250 does not communicate with discharge port 40, so that the fuel in end-chamber 168 exerts a pressure on the left-hand end of shuttle piston 162 urging it toward the right in FIG. 13. The fuel in right-hand end-chamber 170 is thereby forced to flow from end-chamber 170 through passageway 174 in piston 162, thence through bridging chamber 204 in the adjustable bridging sleeve 198, then through the other axial passageway 176 in piston 162 to annular outlet chamber 189, and thence by way of slot 262 in distributor shaft 250 to discharge outlet 48.

Motion of piston 162 to the right continues until annular flange 210 thereof reaches the blocking surface 208 of sleeve 198 and thereby seals off piston passageway 174 from piston passageway 176. At this point there is no outlet for fluid from right-hand end-chamber 170, and the fluid in the latter chamber therefore provides a cushioned but definite arrest of further rightward motion of piston 162. The axial position of piston 162 for which such arrest occurs can be varied by varying the axial position of sleeve 198 and hence the position of the blocking surface 208 thereon, adjustment of sleeve 198 to the right permitting further rightward motion of piston 162 and a longer piston stroke.

The left-hand end of the shuttle piston stroke is thereby fixed by the position at which passage 230 communicates with left-hand end-chamber 168, while the right-hand limit of the piston stroke is determined by the axial position of the sleeve 198, which moves with control arm 90. The threaded adjustability of the adjustment sleeve 200 permits initial adjustment of the quantity of fuel delivered for a given throttle governor arm position and also permits balancing of the operations of the three shuttle-piston fluid metering devices to produce equal metered quantities of output fuel from them.

While in the arrangement specifically shown the blocking of the bridging chamber by the blocking surface 208 is produced by mating with the external peripheral surface of the annular flange 210 on piston 162, it is also possible to achieve similar blocking by causing cross-bore 178 to extend through a portion of the piston having a diameter equal to the interior diameter of the blocking surface 208, so that discharge from cross-bore 178 is blocked as soon as piston 162 has moved sufficiently to the right that cross-bore 178 is completely closed off by the blocking surface.

Other arrangements for providing such blocking of the outlet means for end-chamber 170 upon attainment by piston 162 of a predetermined position with respect to the fuel-quantity control structure will become apparent to one skilled in the art from the teachings set forth herein.

While the apparatus thus far described is capable of delivering metered quantities of fuels on sequence to each of the twelve discharge ports of FIG. 2, thereby to operate a twelve cylinder engine, in the example shown the discharge ports 32, 34, 36 and 38 have been plugged so that no fuel can be discharged therefrom. Since these four discharge ports are those supplied from fuel metering structure 74, the latter fuel metering structure does not operate in this example, while the other two fuel metering structures operate in the normal way to supply metered fuel to the other eight discharge ports for the corresponding eight cylinders of the engine 10. In the case of a six cylinder engine, the first, third, fifth, seventh, ninth and eleventh ports to discharge metered fuel may be connected to the corresponding injection valves for the six cylinders of the engine, while the other discharge ports may be returned to the fuel reservoir 22 by any appropriate fuel line. Other appropriate combinations of the discharge ports may be blocked, or returned to the fuel reservoir, for operation with other numbers of cylinders from one to twelve. This can be done without changing the gears or the internal construction of the apparatus of the invention, and without interfering with proper balanced operation of the shuttle-piston fluid metering devices.

Figure 14:
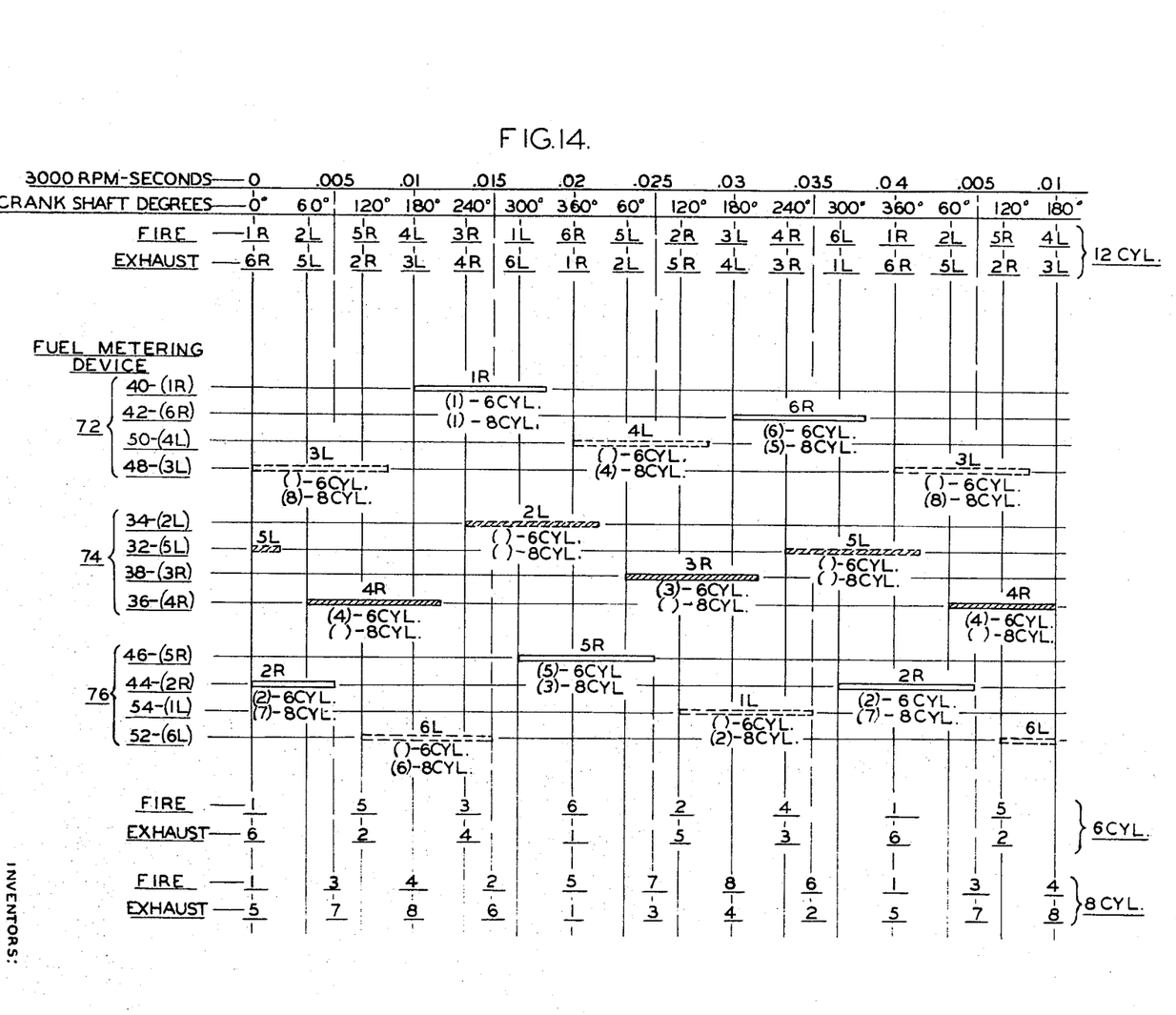
FIG. 14 is a timing diagram to which reference will be made in describing system operations.

FIG. 14 illustrates a preferred arrangement of the timing of the system, obtained by suitable selection of the gear ratios, of the angles at which the fuel supply shaft supplies fuel to the three shuttle-piston cylinders, and of the angular positions of the slots in the two distributor shafts. In the figure, time increases from left to right for the case in which the engine is operating at 3,000 r.p.m., although the same relations hold at other speed since all relationships change proportionally with speed. At the top of the figure are shown time intervals for ¼ of a crankshaft revolution, this interval in this case being 0.005 second. Next there are shown, for the case of a twelve-cylinder engine, the times at which the cylinders are fired and exhausted, the numeral designations indicating the number of the cylinder and the suffix L or R indicating whether it is in the left or right bank of an assumed V-12 engine. Next below, at the left edge of the figure, there are listed the numbers of the three fuel metering devices 72, 74 and 76 and the numbers of the four discharge ports which each supplies; in parentheses thereafter are indicated the cylinder to which the corresponding discharge port is connected for twelve cylinder engine operation.

The rectangles plotted on the chart of FIG. 14 indicate the times of occurrence and the approximate duration of the metering mode during which fuel is metered from the particular discharge port with which the rectangle is horizontally aligned. Adjacent each rectangle there is indicated first the identification of the cylinder to which metered fuel is supplied in the case of a twelve-cylinder engine; directly beneath that is the number of the cylinder supplied with metered fuel during this interval in the case of a six-cylinder engine, and beneath that the same data for the case of an eight-cylinder engine.

In the case of a six-cylinder engine, only every other metering mode is utilized, namely those shown by the solid-line rectangles, those indicated by dotted-line rectangles not being used in the case of a six-cylinder engine; instead, the corresponding discharge ports are connected back to the fuel reservoir as described previously. In the case of an eight-cylinder engine, the four discharge ports supplied from fuel metering device 74 are plugged and hence the corresponding metering modes are not employed, as is indicated by the transverse hatching on the corresponding rectangles in FIG. 14. Beneath the plot of rectangles there are first shown the firing and exhaust orders for a six-cylinder engine, and beneath that the corresponding data for an eight-cylinder engine.

Accordingly, in the case of a twelve-cylinder engine all metering modes shown are utilized, in the case of a six-cylinder engine only those represented by solid-line rectangles are utilized, and in the case of an eight-cylinder engine all metering modes except those cross-hatched are utilized. From the timing diagram it will readily be appreciated that, for any of the three types of engines depicted, each operative metering mode occurs between corresponding successive firing modes for that cylinder, as desired. From this illustration it will also be obvious how any number of cylinders from one to twelve may readily be accommodated by blocking, or returning to reservoir, particular ones of the discharge ports.

While other numbers of fuel supply shafts, fuel metering devices and fuel distributing structures may be utilized in certain cases, the particular arrangement shown provides a high degree of versatility and en exceedingly compact and simple construction. In addition, accurate and reliable control of metered fuel quantity is provided without requiring an adjustable mechanical stop, with the advantages mentioned hereinbefore.

While the invention has been described in the interest of complete definiteness with particular reference to specific embodiments thereof, it will be understood that it may be embodied in any of a variety of forms diverse from those specifically shown and described without departing from the scope of the invention.

We claim:

1. In a fluid metering device comprising: cylinder means; a shuttle piston disposed in said cylinder means for axial motion therein in response to differences in fluid pressure at opposite end surfaces of said piston; outlet means, communicating with an interior region of said cylinder means which is disposed beyond one end of said piston, for discharging fluid from said cylinder means by way of said outlet means in response to motion of said piston along a direction toward said region; and means for arresting said piston at a controlledly-variable position in its motion along said direction;

the improvement wherein the end wall of said cylinder means adjacent said interior region is closed and said outlet means communicates with said interior region other than through said end wall, said means for arresting said piston comprises means for blocking said outlet means in response to attainment by said piston of said position, whereby motion of said piston is arrested by fluid trapped in said interior region of said cylinder means before said piston reaches said end wall, and means for varying the position of said piston for which said blocking occurs.

2. Apparatus in accordance with claim 1, in which said outlet means comprises a first passageway in said piston communicating at one end with said region in said cylinder means, a second passageway in said piston communicating at one end with the exterior of said cylinder means, and means exterior to said cylinder means providing a third passageway interconnecting the other ends of said first and second passageways during motion of said piston; said means for blocking said outlet means comprising a blocking surface on said exterior means cooperating with an adjacent surface of said piston to block said third passageway when said piston reaches said position, said means for varying the position of said piston for which said blocking occurs comprising means for controlledly varying the position of said blocking surface of said exterior means with respect to said cylinder means.

3. Apparatus in accordance with claim 2, in which said exterior means comprises a member slidable on said piston in an axial direction with respect thereto, said third passageway comprising an internal relief in said member extending along the external surface of said piston and bridging said other ends of said first and second passageways during travel of said piston, whereby motion of said other end of said first passageway beyond said internal relief seals off said first passageway from said second passageway to arrest said piston.

4. In apparatus for producing a metered flow of liquid, comprising: a source of liquid under pressure; cylinder means having closed opposite ends forming first and second axially spaced-apart end-chambers in said cylinder means adjacent said opposite ends; a shuttle piston supported in said cylinder means between said end-chambers for axial reciprocatory motion in said cylinder in response to differences in liquid pressure in said end-chambers; first liquid inlet means for delivering liquid to said first end-chamber; second liquid inlet means for delivering liquid to said second end-chamber; first means connecting said liquid source to said first inlet means; second means connecting said liquid source to said second inlet means; means for blocking said first and second connecting means alternately, thereby to urge said piston alternately in opposite axial directions in response to liquid pressure; first outlet means communicating with said first end-chamber when said piston moves into said first end-chamber; first means for blocking said first outlet means when said second connecting means is blocked; second outlet means communicating with said second end-chamber when said second connecting means is blocked for discharging liquid from said second end-chamber when said piston moves into said second end-chamber; second means for blocking said second outlet means at a predetermined location therein when said first connecting means is blocked; first means for arresting the travel of said piston into said first end-chamber; and second means for arresting the travel of said piston into said second end-chamber at a predetermined controllable position; the improvement in accordance with which:

said second outlet means comprises a first passageway in said piston communicating at one end thereof with said second end-chamber, a second passageway in said piston communicating at one end thereof with said predetermined location in said second outlet means, the other ends of said first and second passageways being open and terminating at different points along the surface of said piston, and a third passageway exterior to said piston and connecting said first and second passageways during travel of said piston; said second arresting means comprising control sleeve means adjustable in axial location with respect to said cylinder means and having a blocking surface thereon for blocking communication between said other ends of said first and second passageways by way of said third passageway when said piston reaches said position, whereby adjustment of said axial location of said sleeve means controls said position at which said piston travel is arrested.

5. Apparatus in accordance with claim 4, in which said third passageway comprises an annular relief in the inner side of said sleeve, in which said piston comprises an annular blocking flange positioned between said other ends of said first and second passageways and having a diameter such as to provide a seal against flow of said liquid when aligned with said blocking surface.

6. A liquid metering device, comprising:
a first cylinder chamber having a closed end and an open end, a first inlet port, a first outlet port and a second outlet port;
a second cylinder chamber having a closed end, an open end and a second inlet port, said second chamber being aligned axially with said first chamber with its open end facing that of said first chamber;
a piston supported for reciprocatory axial motion in said chambers with a first end thereof sliding in said first chamber and a second end thereof sliding in said second chamber;
piston-travel control means surrounding and in sliding engagement with a portion of said piston between said first and second chambers, said piston-travel control means being adjustably positionable axially with respect to said chambers;
said piston having therein a first axial bore extending into said piston from said second end thereof; a second axial bore axially spaced from said first bore, first and second axially-spaced transverse bores at adjacent ends of said first and second axial bores respectively, and a third transverse bore at the other end of said second axial bore and communicating with said second outlet port;
said piston-travel control means comprising an annular passageway having an axial length sufficient to bridge and interconnect said first and second axially-spaced transverse bores during travel of said piston, and further comprising a blocking surface adjacent one side of said annular passageway cooperating with a surface region of said piston to terminate liquid flow between said first and second transverse bores when said piston has moved into said second chamber to a predetermined extent.

7. Fuel metering and distributing apparatus for an engine, comprising:
a housing block;
three shuttle-piston fuel metering devices in said block, each comprising a cylinder in said block, a corresponding shuttle piston in said cylinder, and a pair of outlets for discharge of fuel from opposite ends of each of said cylinders in response to motion of the associated shuttle piston;
fuel supply means in said block comprising another cylinder in said block and a rotatable fuel supply shaft therein for supplying said fuel alternately to opposite ends of said pistons at different times for the three pistons, thereby to produce six differently-timed metered discharges of said fuel from said outlets of said fuel metering devices;
two fuel-distributing means each comprising a cylinder in said block and a distributor shaft rotatable therein and each supplied with said fuel from three different ones of said outlets of said two fuel metering devices, each of said distributor shafts comprising three fluid outlet means rotatable therewith;

twelve fuel discharge ports in said block, six of said fuel discharge ports being connected to receive fuel in sequence from the three fuel outlet means in one of said distributor shafts as it rotates, the other six of said fuel discharge ports being connected to receive fuel in sequence from the three fluid outlet means in the other of said distributor shafts; and gear means for rotating said fuel supply shaft and said distributor shafts in synchronism with each other and with engine operation.

8. Apparatus in accordance with claim 7, comprising variably-positionable hydraulic stop means for controlling the length of stroke of said shuttle pistons.

References Cited

UNITED STATES PATENTS

| | | | |
|---|---|---|---|
| 507,316 | 10/1893 | Fowler | 222—250 |
| 2,110,405 | 3/1938 | Starr | 222—250 |
| 3,191,812 | 6/1965 | Asaka et al. | 123—139 X |

SAMUEL F. COLEMAN, Primary Examiner

F. R. HANDREN, Assistant Examiner

U.S. Cl. X.R.

222—330; 123—139 AM